(12) United States Patent
Kim (10) Patent No.: US 11,724,699 B2
(45) Date of Patent: Aug. 15, 2023

(54) METHOD OF CONTROLLING POWERTRAIN OF VEHICLE

(71) Applicants: Hyundai Motor Company, Seoul (KR); Kia Corporation, Seoul (KR)

(72) Inventor: Jin Sung Kim, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 17/699,930

(22) Filed: Mar. 21, 2022

(65) Prior Publication Data
US 2022/0402496 A1 Dec. 22, 2022

(30) Foreign Application Priority Data
Jun. 21, 2021 (KR) .................. 10-2021-0080264

(51) Int. Cl.
*F16H 61/04* (2006.01)
*F16H 59/14* (2006.01)
*B60W 30/19* (2012.01)
*B60W 10/04* (2006.01)
*B60W 10/02* (2006.01)
*F16D 48/06* (2006.01)
(Continued)

(52) U.S. Cl.
CPC ............ *B60W 30/19* (2013.01); *B60W 10/02* (2013.01); *B60W 10/04* (2013.01); *F16D 48/06* (2013.01); *F16H 61/04* (2013.01); *B60W 2510/0275* (2013.01); *B60W 2710/027* (2013.01); *F16D 2500/10412* (2013.01); *F16D 2500/30406* (2013.01); *F16D 2500/30412* (2013.01); *F16D 2500/30814* (2013.01); *F16D 2500/70605* (2013.01); *F16H 59/14* (2013.01); *F16H 59/56* (2013.01); *F16H 2061/0012* (2013.01)

(58) Field of Classification Search
CPC ...... B60W 30/19; B60W 10/02; B60W 10/04; B60W 2510/0275; B60W 2710/027; F16H 61/04; F16H 59/14; F16H 59/56; F16H 2061/0012; F16D 48/06; F16D 2500/10412; F16D 2500/30406; F16D 2500/30412; F16D 2500/30814; F16D 2500/70605
See application file for complete search history.

(56) References Cited

U.S. PATENT DOCUMENTS

2009/0118082 A1* 5/2009 Heap .................. F16H 61/0437
180/65.21
2009/0118949 A1* 5/2009 Heap .................... B60K 6/365
701/55
(Continued)

FOREIGN PATENT DOCUMENTS

KR 2019-0041828 A 4/2019

*Primary Examiner* — Tisha D Lewis
(74) *Attorney, Agent, or Firm* — Fox Rothschild LLP (57) ABSTRACT

A method of controlling a powertrain of a vehicle is carried out such that during shifting in which a first clutch is released and a second clutch is engaged, whether a current shift phase is a torque phase or an inertia phase is determined. Different cost functions for the torque phase and the inertia phase are predefined. A control input change for minimizing the cost functions in the torque phase and the inertia phase is calculated. At least two among input torque, first clutch torque, or second clutch torque input to a transmission are controlled by applying the control input change calculated for the torque phase and the inertia phase.

11 Claims, 4 Drawing Sheets (51) Int. Cl.
  *F16H 61/00* (2006.01)
  *F16H 59/56* (2006.01)

(56) References Cited

U.S. PATENT DOCUMENTS

2015/0275711 A1* 10/2015 Whitney .............. G05B 13/048
                                                  701/105
2016/0091059 A1*  3/2016 Boulet ...................... F16H 3/64
                                                  475/149

* cited by examiner

METHOD OF CONTROLLING POWERTRAIN OF VEHICLE

CROSS REFERENCE TO RELATED APPLICATION

The present application claims under 35 U.S.C. § 119(a) the benefit of Korean Patent Application No. 10-2021-0080264, filed on Jun. 21, 2021, the entire contents of which are incorporated by reference herein.

BACKGROUND

(a) Technical Field

The present disclosure generally relates to a method of controlling a powertrain that transmits power generated by a power source, such as an engine or a motor, to a drive wheel.

(b) Description of the Related Art

Since it is difficult for a vehicle to directly measure engine torque, the engine torque is generally calculated by modeling to be used in controlling a powertrain of a vehicle provided with an engine. However, such engine torque calculated by the modeling may include an error. When an inaccurate engine torque is used in controlling the powertrain during shifting, a feeling of the shifting of the powertrain may be reduced and an accident may occur.

In addition, torque input to the transmission from the power source, such as the engine or the motor, must be controlled to be reduced appropriately, and a clutch torque of the transmission must be controlled appropriately in shifting, so that the shifting may be performed smoothly and properly. However, the input torque and the clutch torque continuously change over time, and thus, it is difficult to simultaneously control the two inputs.

In addition, in the development of a powertrain of a vehicle, shifting performance may have significant variations according to shift cases depending on a degree of completion of calibration of the powertrain. Recently, with increases in the shift positions of the transmission, shift cases to be calibrated increase. Thus, at an early stage of the development, manpower for obtaining fundamental performance of the powertrain tends to significantly increase.

The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes a method of controlling a powertrain of a vehicle, in which, when shifting of the vehicle powertrain is controlled, it is possible to consider power, energy efficiency, and the like, realize simultaneous multiple-input and multiple-output control in a relatively easy manner, and easily obtain control performance of the powertrain, so that superior shift quality may be obtained at relatively low cost.

In order to achieve the above objective, according to one aspect of the present disclosure, there is provided a method of controlling a powertrain of a vehicle, the method including: in case of shifting in which a first clutch is released and a second clutch is engaged, determining whether a current shift phase is a torque phase or an inertia phase; configuring different cost functions for the torque phase and the inertia phase; calculating a control input change for minimizing the cost functions in the torque phase and the inertia phase; and controlling at least two among input torque, first clutch torque, or second clutch torque input to a transmission by applying the control input change calculated for the torque phase and the inertia phase.

Each of the cost functions may be:

$$\min_{\Delta u} \sum_{j=0}^{N_x-1} \left\| z^i(k+j|k) - r^i(k) \right\|_Q^2 + \sum_{j=0}^{N_u-1} \left\| \Delta u^i(k+j|k) \right\|_R^2,$$

$$i \in \{tp, ip\},$$

where tp indicates a torque phase,
ip indicates an inertia phase,
$N_x$ indicates a prediction horizon,
$N_u$ indicates a control horizon,
k indicates a sampling time,
$z^i$ indicates a control variable matrix,
$r^i$ indicates a control reference matrix,
$u^i$ indicates a control input matrix,
Q indicates a weight matrix for control reference following errors, and
R indicates a weight matrix for a control input change.

When the shift phase is the torque phase, the control variable matrix may be:

$$z^{tp} = [\alpha x_4 x_5 x_6]^T,$$

where $\alpha$ indicates a vehicle jerk,
$x_4$ indicates torsion between the first clutch and a drive wheel,
$x_5$ indicates the first clutch torque, and
$x_6$ indicates the second clutch torque, and
the control reference matrix may be:

$$r^{tp} = [0 r_4 r_5 r_6]^T,$$

where $r_4$ indicates reference torsion between the first clutch and the drive wheel,
$r_5$ indicates first reference clutch torque, and
$r_6$ indicates second reference clutch torque.

When the shift phase is the torque phase, the control input matrix may be:

$$u^{tp} = [u_1, u_2]^T = \left[ \frac{dT_{c1}}{dt}, \frac{dT_{c2}}{dt} \right]^T,$$

where $T_{c1}$ indicates the first clutch torque, and
$T_{c2}$ indicates the second clutch torque.

When the shift phase is the torque phase, the weight matrix for the control reference following errors may be:

$$Q = \begin{bmatrix} q_1 & 0 & 0 & 0 \\ 0 & q_2 & 0 & 0 \\ 0 & 0 & q_3 & 0 \\ 0 & 0 & 0 & q_4 \end{bmatrix},$$

where $q_1$ indicates a weight for the vehicle jerk,
$q_2$ indicates a weight for the torsion between the first clutch and the drive wheel,
$q_3$ indicates a weight for the first clutch torque, and
$q_4$ indicates a weight for the second clutch torque, and the weight matrix for the control input change may be:

$$R = \begin{bmatrix} r_1 & 0 \\ 0 & r_2 \end{bmatrix},$$

where $r_1$ indicates a weight for a first clutch torque change, and $r_2$ indicates a weight for a second clutch torque change.

When the shift phase is the torque phase, in the calculation of the control input change for minimizing the cost functions by the optimization, the control variable matrix may meet control variable constraints:

$$\begin{bmatrix} \alpha_{min} \\ x_{4,min} \\ x_{5,min} \\ x_{6,min} \end{bmatrix} \leq z = \begin{bmatrix} \alpha \\ x_4 \\ x_5 \\ x_6 \end{bmatrix} \leq \begin{bmatrix} \alpha_{max} \\ x_{4,max} \\ x_{5,max} \\ x_{6,max} \end{bmatrix},$$

and the control input matrix may be configured to meet control input constraints:

$$\begin{bmatrix} \Delta T_{c1,min} \\ \Delta T_{c2,min} \end{bmatrix} \leq u = \begin{bmatrix} u_1 \\ u_2 \end{bmatrix} \leq \begin{bmatrix} \Delta T_{c1,max} \\ \Delta T_{c2,max} \end{bmatrix}$$

When the shift phase is the torque phase, the control input change calculated by the optimization may include the first clutch torque change and the second clutch torque change, and the first clutch torque and the second clutch torque may be controlled by applying the first clutch torque change and the second clutch torque change.

When the shift phase is the inertia phase, the control variable matrix may be:

$$z^{ip} = [\alpha x_2 x_5 x_6]^T,$$

where $\alpha$ indicates a vehicle jerk, $x_2$ indicates a slip of the second clutch,
$x_5$ indicates the input torque, and
$x_6$ indicates the second clutch torque, and
the control reference matrix may be:

$$r^{ip} = [0 r_2 r_5 r_6]^T,$$

where $r_2$ indicates a reference slip of the second clutch,
$r_5$ indicates a reference input torque, and
$r_6$ indicates a reference second clutch torque.

When the shift phase is the inertia phase, the control input matrix may be:

$$u^{ip} = [u_1, u_2]^T = \left[\frac{dT_{in}}{dt}, \frac{dT_{c2}}{dt}\right]^T,$$

where $T_{in}$ indicates the input torque, and
$T_{c2}$ indicates the second clutch torque.

When the shift phase is the inertia phase, the weight matrix for the control reference following errors may be:

$$Q = \begin{bmatrix} q_1 & 0 & 0 & 0 \\ 0 & q_2 & 0 & 0 \\ 0 & 0 & q_3 & 0 \\ 0 & 0 & 0 & q_4 \end{bmatrix},$$

where $q_1$ indicates a weight for the vehicle jerk,
$q_2$ indicates a weight for a slip of the second clutch,
$q_3$ indicates a weight for the input torque, and
$q_4$ indicates a weight for the second clutch torque, and
the weight matrix for the control input change may be:

$$R = \begin{bmatrix} r_1 & 0 \\ 0 & r_2 \end{bmatrix},$$

where $r_1$ indicates a weight for an input torque change, and $r_2$ indicates a weight for a second clutch torque change.

When the shift phase is the inertia phase, in the calculation of the control input change for minimizing the cost functions, the control variable matrix may meet control variable constraints:

$$\begin{bmatrix} \alpha_{min} \\ x_{2,min} \\ x_{5,min} \\ x_{6,min} \end{bmatrix} \leq z = \begin{bmatrix} \alpha \\ x_2 \\ x_5 \\ x_6 \end{bmatrix} \leq \begin{bmatrix} \alpha_{max} \\ x_{2,max} \\ x_{5,max} \\ x_{6,max} \end{bmatrix},$$

and the control input matrix may be configured to meet control input constraints:

$$\begin{bmatrix} \Delta T_{in,min} \\ \Delta T_{c2,min} \end{bmatrix} \leq u = \begin{bmatrix} u_1 \\ u_2 \end{bmatrix} \leq \begin{bmatrix} \Delta T_{in,max} \\ \Delta T_{c2,max} \end{bmatrix}$$

When the shift phase is the inertia phase, the control input change calculated by the optimization may include the input torque change and the second clutch torque change, and the input torque and the second clutch torque input to the transmission may be controlled by applying the input torque change and the second clutch torque change.

According to the present disclosure, when the shifting of the vehicle powertrain is controlled, it is possible to consider power, energy efficiency, and the like, realize simultaneous multiple-input and multiple-output control in a relatively easy manner, and easily obtain control performance of the powertrain, so that superior shift quality may be obtained at relatively low cost.

In addition, according to the present disclosure, cost functions may be processed by an optimization algorithm so as to reduce the number of maps that increase the non-linearity in a controller, such as a transmission control unit (TCU), reduce the complexity of control software, and reduce a memory.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural and functional descriptions of embodiments of the present disclosure disclosed herein are only for illustrative purposes of the embodiments of the present disclosure. The present disclosure may be embodied in many different forms without departing from the spirit and significant characteristics of the present disclosure. Therefore, the embodiments of the present disclosure are disclosed only for illustrative purposes and should not be construed as limiting the present disclosure.

Reference will now be made in detail to various embodiments of the present disclosure, specific examples of which are illustrated in the accompanying drawings and described below, since the embodiments of the present disclosure can be variously modified in many different forms. While the present disclosure will be described in conjunction with exemplary embodiments thereof, it is to be understood that the present description is not intended to limit the present disclosure to those exemplary embodiments. On the contrary, the present disclosure is intended to cover not only the exemplary embodiments, but also various alternatives, modifications, equivalents and other embodiments that may be included within the spirit and scope of the present disclosure as defined by the appended claims.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, exemplary embodiments of the present disclosure will be described in detail with reference to the accompanying drawings. Throughout the drawings, the same reference numerals will refer to the same or like parts.

Figure 1:
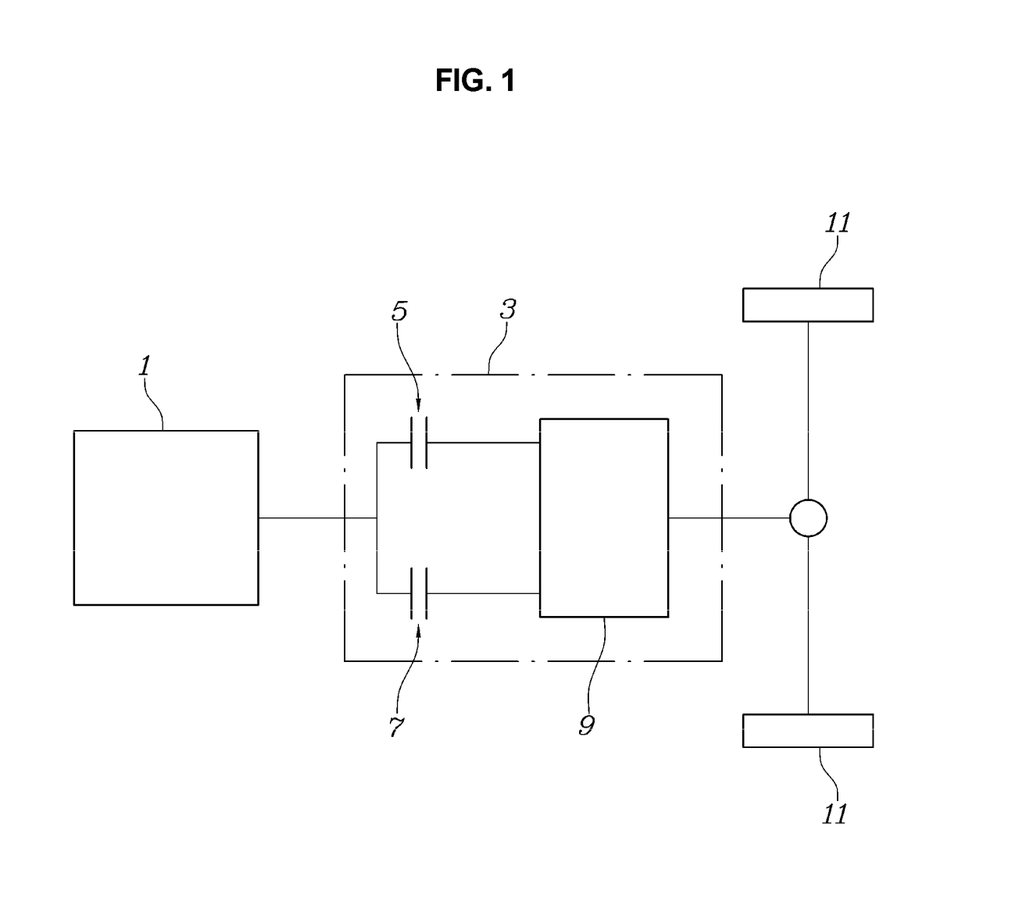
FIG. 1 is a diagram illustrating a powertrain of a vehicle to which the present disclosure is applicable.

FIG. 1 is a diagram illustrating a powertrain of a vehicle to which the present disclosure is applicable. Power input from a power source 1 to a transmission 3 is input to a transmission gear train 9 through a first clutch 5 or a second clutch 7. The power shifted by the transmission gear train 9 may be transmitted to drive wheels 11, thereby propelling the vehicle.

The power source 1 may be only an engine, i.e., an internal combustion engine of the related art, only a motor, or a combination of the engine and the motor.

The transmission 3 may be implemented as any type of transmission, such as a dual clutch transmission (DCT) or an automatic transmission including a torque converter, able to perform so-called the clutch to clutch shifting in which shifting is enabled by releasing one clutch and simultaneously engaging the other clutch.

Figure 2:
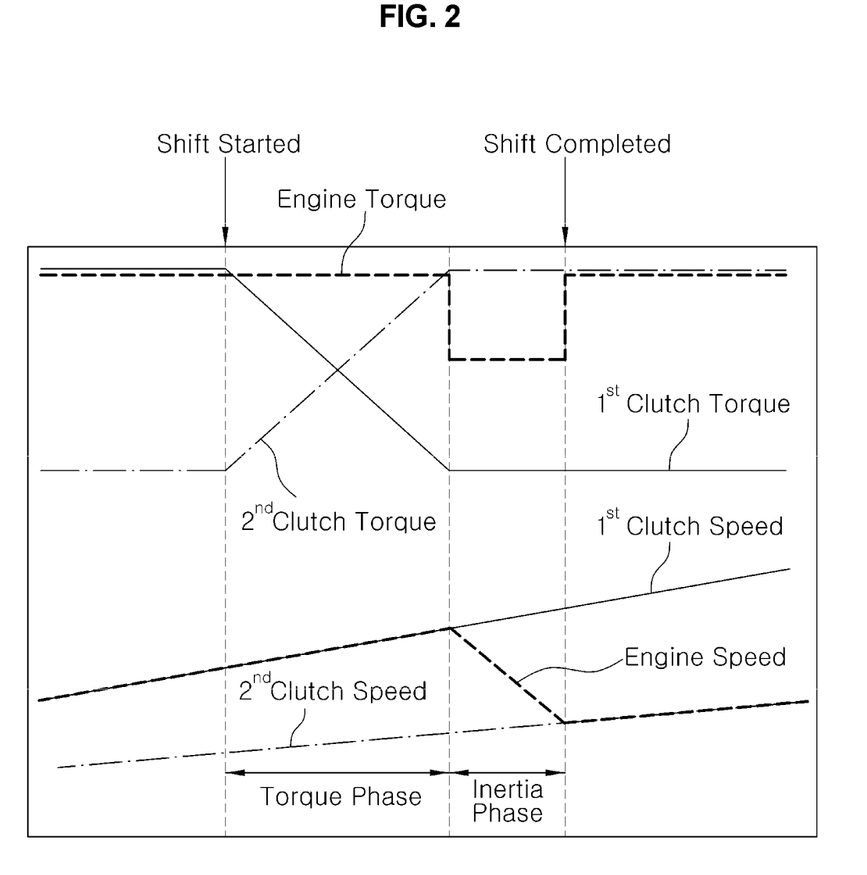
FIG. 2 is a graph illustrating a shift process that may be performed by the transmission including the powertrain illustrated in FIG. 1.

FIG. 2 illustrates an example in which a clutch to clutch upshifting to a higher shift position is performed in the above-described transmission, in a situation of which a power source providing torque input to the transmission is an engine.

Before the start of the shifting, a first clutch is in an engaged state, with the torque thereof (i.e., first clutch torque) being equal to or higher than the torque of the engine (i.e., engine torque). Thus, the speed of the engine serving as the power source is the same as the speed of the first clutch. As the shifting is started, the first clutch torque is reduced while the torque of a second clutch (i.e., second clutch torque) is increased (torque phase). Subsequently, in an inertia phase, the engine torque is reduced, so that the speed of the engine is changed from the speed of the first clutch so as to be synchronized with the speed of the second clutch. When the speed of the engine is synchronized with the speed of the second clutch at the end of the inertia phase as described above and the second clutch does not slip due to the second clutch torque even in the case that the engine torque that has been reduced is increased again, the shifting is completed.

For the sake of convenience, a shift position in which the first clutch is engaged before the shifting will be referred to as a "current shift position", whereas a shift position in which the second clutched is engaged after the shifting will be referred to as a "target shift position".

Figure 3:
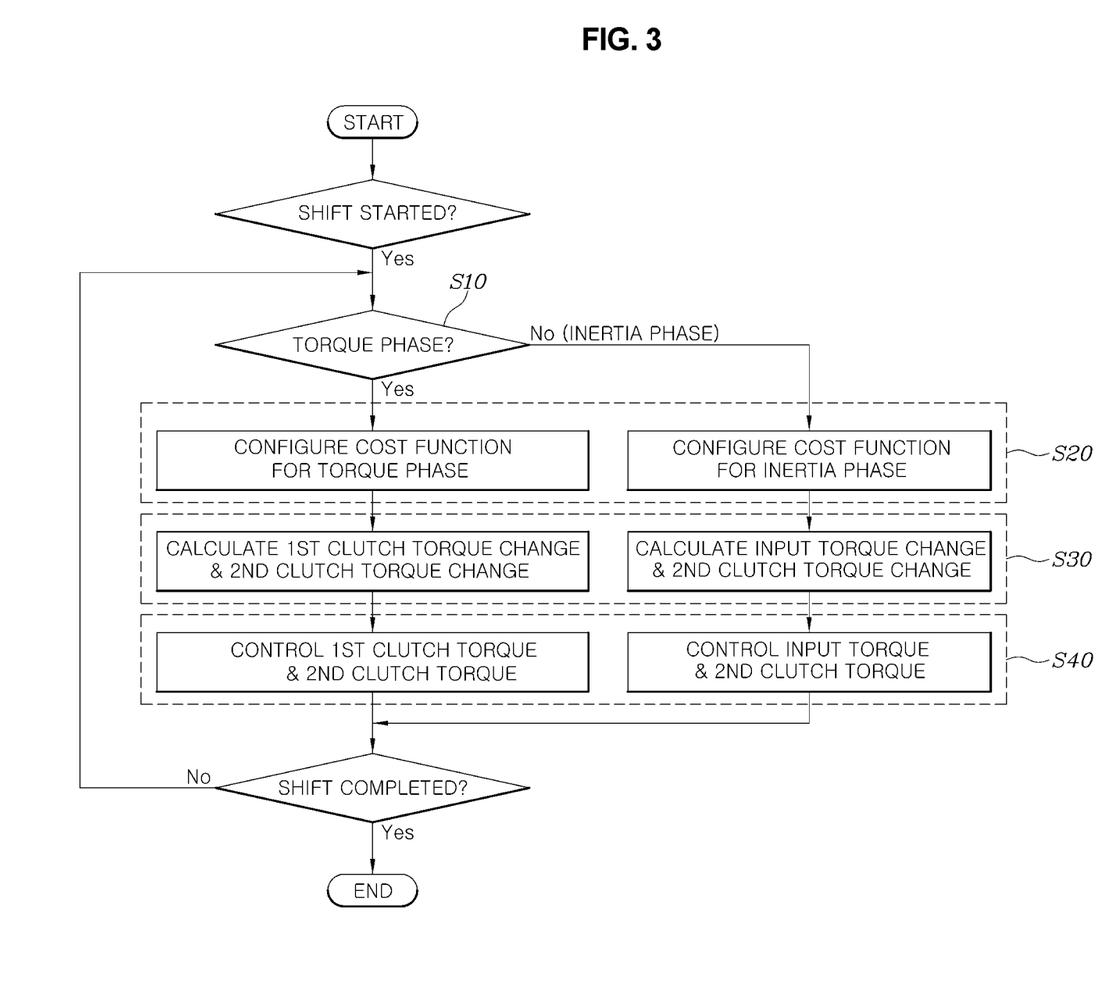
FIG. 3 is a flowchart illustrating an embodiment of a method of controlling a powertrain of a vehicle according to the present disclosure.

Referring to FIG. 3, an embodiment of a method of controlling a powertrain of a vehicle according to the present disclosure includes: in case of shifting in which the first clutch is released and the second clutch is engaged, step S10 of determining whether a current shift phase is a torque phase or an inertia phase; step S20 of configuring different cost functions for the torque phase and the inertia phase; step S30 of calculating a control input change for minimizing the cost functions in the torque phase and the inertia phase by an optimization method; and step S40 of controlling at least two among input torque, first clutch torque, or second clutch torque input to the transmission by applying the control input change calculated for the torque phase and the inertia phase.

In the step S30, when the shift phase is the torque phase, the control input change calculated by the optimization method includes a first clutch torque change and a second clutch torque change. In the step S40, the first clutch torque and the second clutch torque are controlled by applying the first clutch torque change and the second clutch torque change.

In addition, in the step S30, when the shift phase is the inertia phase, the control input change calculated by the optimization method includes an input torque change and the second clutch torque change. In the step S40, the input torque input to the transmission and the second clutch torque are controlled by applying the input torque change and the second clutch torque change.

That is, the present disclosure is designed to control the first clutch torque and the second clutch torque in the torque phase and to control the input torque and the second clutch torque in the inertia phase by processing the cost functions configured differently for the shift phases (i.e., the torque phase and the inertia phase) by the optimization method.

Here, the input torque is torque input to the transmission from the power source as described above. When the power source is the engine, the input torque may be engine torque. When the power source is the engine and the motor, the input torque may be the torque of the engine (i.e., engine torque) and the torque of the motor (i.e., motor torque).

For reference, the first clutch torque and the second clutch torque may be controlled by a transmission control unit (TCU) controlling the transmission, whereas the engine torque may be controlled by an engine control unit (ECU) at the request of the TCU.

When the power source includes the motor, a motor control unit (MCU) may be used in controlling the input torque at the request of the TCU. These control units may have different names or a variety of configurations, in which the control units are integrated with or separated from each other, depending on the situation of each vehicle.

Each of the cost functions may be expressed as:

$$\min_{\Delta u} \sum_{j=0}^{N_x-1} \|z^i(k+j|k) - r^i(k)\|_Q^2 + \sum_{j=0}^{N_u-1} \|\Delta u^i(k+j|k)\|_R^2,$$

$i \in \{tp, ip\}$, where tp indicates a torque phase,
ip indicates an inertia phase,
$N_x$ indicates a prediction horizon,
$N_u$ indicates a control horizon,
k indicates a sampling time,
$z^i$ indicates a control variable matrix,
$r^i$ indicates a control reference matrix,
$u^i$ indicates a control input matrix,
Q indicates a weight matrix for control reference following errors, and
R indicates a weight matrix for control input change.

The present disclosure is a type of a model predictive control (MPC) configured to model the powertrain of the vehicle performing shifting using the control variable matrix, obtain an optimum control input matrix allowing the control variable matrix to follow the control reference matrix, and accordingly control the powertrain of the vehicle.

The prediction horizon $N_x$ indicates the number of future outputs to be predicted, and the control horizon $N_u$ indicates number of future control inputs to be predicted.

When the shift phase is the torque phase, the control variable matrix may be expressed as:

$$z^{tp} = [\alpha x_4 x_5 x_6]^T,$$

where $\alpha$ indicates a jerk of a vehicle (hereinafter, referred to as a "vehicle jerk"),
$x_4$ indicates the torsion between the first clutch and the drive wheel,
$x_5$ indicates the first clutch torque, and
$x_6$ indicates the second clutch torque.

The control reference matrix may be expressed as:

$$r^{tp} = [0 r_4 r_5 r_6]^T,$$

where $r_4$ indicates reference torsion between the first clutch and the drive wheel,
$r_5$ indicates first reference clutch torque, and
$r_6$ indicates second reference clutch torque.

That is, in the torque phase, the vehicle jerk, the torsion between the first clutch and the drive wheel, and the first clutch torque, and the second clutch torque are treated as main control variables.

In the present embodiment, the vehicle jerk may be expressed as:

$$\alpha = \frac{da_v}{dt} = \frac{d(\dot{\omega}_{c2}/\gamma_f \gamma_2 \cdot r)}{dt},$$

where $a_v$ indicates the longitudinal acceleration of the vehicle,
$\dot{\omega}_{c2}$ indicates the angular acceleration of the second clutch,
$\gamma_f$ indicates a longitudinal deceleration gear ratio,
$\gamma_2$ indicates the gear ratio of the target shift position, and r indicates the radius of the dynamic load of the drive wheel.

That is, a value obtained by differentiating the angular acceleration of the second clutch is determined to be the vehicle jerk.

In addition, the torsion between the first clutch and the drive wheel is expressed as:

$$x_4 = \frac{\theta_{c1}}{\gamma_f \cdot \gamma_1} - \theta_w,$$

where $\theta_{c1}$ indicates the angle of the first clutch,
$\theta_w$ indicates the angle of the drive wheel,
$\gamma_f$ indicates the longitudinal deceleration gear ratio, and
$\gamma_1$ indicates the gear ratio of the current shift position.

Figure 4:
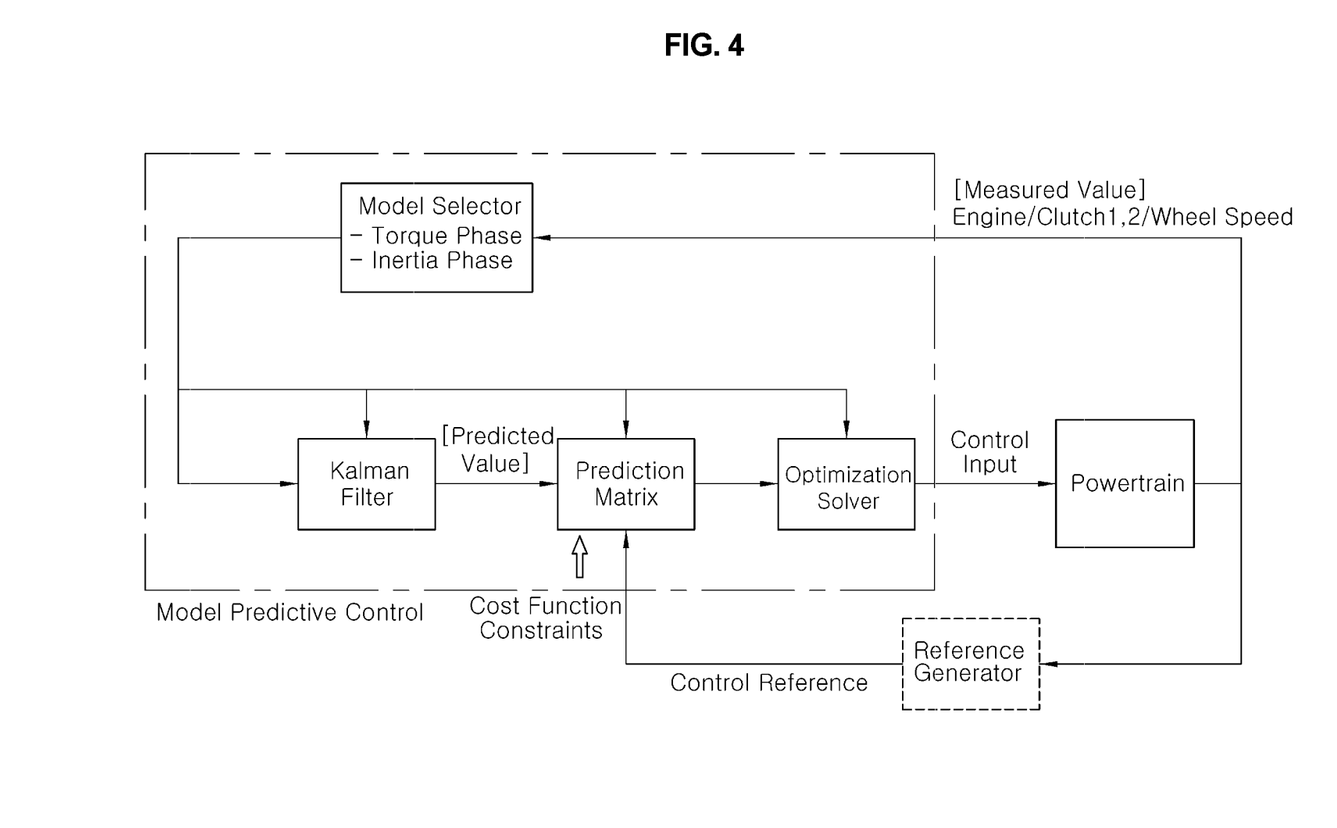
FIG. 4 is a conceptual view illustrating the method of controlling a powertrain of a vehicle according to the present disclosure.

Since it is substantially impossible to measure the angle of the first clutch and the angle of the drive wheel of the vehicle in real time, the torsion between the first clutch and the drive wheel may use a value estimated through the Kalman filter as illustrated in FIG. 4.

For reference, $x_4$, $x_5$, $x_6$ of the control variable matrix are portions of main state variables by which the state of the powertrain of the vehicle can be reviewed when the powertrain operates in the torque phase.

In addition, although not included in the control variable matrix, $x_1$, $x_2$, $x_3$ may be other state values by which the state of the powertrain performing the torque phase can be reviewed.

Here, $x_1$ may indicate the rotation speed of power input to the transmission from the power source, $x_2$ may indicate the speed of the first clutch, and $x_3$ may indicate the speed of the second clutch.

Above-mentioned $x_4$, $x_5$, $x_6$ of the control variable matrix may be calculated by a reference generator illustrated in FIG. 4. The reference generator may substantially be a portion of the TCU and calculate the control references in the same manner as in the related art.

That is, the reference generator may be configured by technologies known in the related art so as to calculate the control references required for suitable shifting, according to the measures obtained from the powertrain, such as the speed of the engine, the speed of the first clutch, the speed of the second clutch, and the speed of the drive wheel, as well as manipulated quantities performed by the driver, such as the displacement of the accelerator pedal and the displacement of the brake pedal.

For reference, the first factor of the control reference matrix is zero (0) because the vehicle jerk is always intended to be 0.

When the shift phase is the torque phase, the control input matrix may be expressed as:

$$u^{tp} = [u_1, u_2]^T = \left[\frac{dT_{c1}}{dt}, \frac{dT_{c2}}{dt}\right]^T,$$

where $T_{c1}$ indicates the first clutch torque, and $T_{c2}$ indicates the second clutch torque.

That is, the control factors in the torque phase include the first clutch torque and the second clutch torque. After the first clutch torque change and the second clutch torque change are calculated in the step S30, the first clutch and the second clutch are controlled using values obtained by adding the first clutch torque change and the second clutch torque change to the first clutch torque and the second clutch torque used in the previous control operation in the step S40.

When the shift phase is the torque phase, the weight matrix for the control reference following errors is:

$$Q = \begin{bmatrix} q_1 & 0 & 0 & 0 \\ 0 & q_2 & 0 & 0 \\ 0 & 0 & q_3 & 0 \\ 0 & 0 & 0 & q_4 \end{bmatrix},$$

where $q_1$ indicates a weight for the vehicle jerk,
$q_2$ indicates a weight for the torsion between the first clutch and the drive wheel,
$q_3$ indicates a weight for the first clutch torque, and
$q_4$ indicates a weight for the second clutch torque.

The weight matrix for control input change is:

$$R = \begin{bmatrix} r_1 & 0 \\ 0 & r_2 \end{bmatrix},$$

where $r_1$ indicates a weight for the first clutch torque change, and $r_2$ indicates a weight for the second clutch torque change.

Here, when each weight of the weight matrix Q for control reference following errors is relatively large, an increased feedback gain leads to a relatively reduced control error. When the weight is relatively small, a reduced feedback gain leads to a relatively increased control error, thereby incurring an effect of tolerating an error to some extent.

In addition, when each weight of the weight matrix R for control input change is relatively large, the control input change is reduced. Thus, the input relatively and gradually varies as the control operation is carried out. In contrast, when the weight is relatively small, the control input change is increased. Thus, the input rapidly varies as the control operation is carried out.

That is, it is possible to change the accuracy and dependency of the control by adjusting the above-described matrices of weights Q and R When the shift phase is the torque phase, in the step S30 of calculating the control input change for minimizing the cost functions by an optimization method, the control variable matrix meets control variable constraints expressed as:

$$\begin{bmatrix} \alpha_{min} \\ x_{4,min} \\ x_{5,min} \\ x_{6,min} \end{bmatrix} \leq z = \begin{bmatrix} \alpha \\ x_4 \\ x_5 \\ x_6 \end{bmatrix} \leq \begin{bmatrix} \alpha_{max} \\ x_{4,max} \\ x_{5,max} \\ x_{6,max} \end{bmatrix}$$

The control input matrix is configured to meet control input constraints expressed as:

$$\begin{bmatrix} \Delta T_{c1,min} \\ \Delta T_{c2,min} \end{bmatrix} \leq u = \begin{bmatrix} u_1 \\ u_2 \end{bmatrix} \leq \begin{bmatrix} \Delta T_{c1,max} \\ \Delta T_{c2,max} \end{bmatrix}$$

For example, the jerk $\alpha$ of the vehicle may be configured such that $\alpha_{min}$ is 0 and $\alpha_{max}$ is a jerk value allowable when performing the shifting.

In addition, regarding the control inputs $\Delta T_{c1}$ and $\Delta T_{c2}$, each of $\Delta T_{c1,min}$, $\Delta T_{c2,min}$, $\Delta T_{c1,max}$, and $\Delta T_{c2max}$ may be configured at a level allowable in an actual vehicle.

In addition, in the shift control, the control operation may be performed by adding constraints limiting power, energy efficiency, and the like to predetermined levels.

When the shift phase is the inertia phase, the control variable matrix is:

$$z^{ip}=[\alpha x_2 x_5 x_6]^T,$$

where $\alpha$ indicates the vehicle jerk,
$x_2$ indicates a slip of the second clutch,
$x_5$ indicates the input torque, and
$x_6$ indicates the second clutch torque.
The control reference matrix is expressed as:

$$r^{ip}=[0 r_2 r_5 r_6]^T,$$

where $r_2$ indicates a reference slip of the second clutch,
$r_5$ indicates a reference input torque, and
$r_6$ indicates a reference second clutch torque.

That is, in the inertia phase, the vehicle jerk, the slip of the second clutch, the input torque, and the second clutch torque are considered as main control variables, differently from in the torque phase.

For reference, $x_2$, $x_5$, $x_6$ of the control variable matrix are portions of main state variables by which the state of the powertrain of the vehicle can be reviewed when the powertrain operates in the inertia phase.

In addition, although not included in the control variable matrix, $x_1$, $x_3$, $x_4$ may be other state values by which the state of the powertrain operating in the inertia phase can be reviewed.

Here, $x_1$ may indicate the rotation speed of power input to the transmission from the power source, $x_3$ may indicate the speed of the second clutch, and $x_4$ may be the torsion between the second clutch and the drive wheel.

When the shift phase is the inertia phase, the control input matrix may be expressed as:

$$u^{ip} = [u_1, u_2]^T = \left[\frac{dT_{in}}{dt}, \frac{dT_{c2}}{dt}\right]^T,$$

where $T_{in}$ indicates the input torque, and
$T_{c2}$ indicates the second clutch torque.

That is, the control factors in the inertia phase include the input torque and the second clutch torque. After the input clutch torque change and the second clutch torque change are calculated in the step S30, the power source, such as the engine or the motor, may be controlled so that a value obtained by adding the input torque change to the input torque used in the previous control operation is input to the transmission and the second clutch is controlled using a value obtained by adding the second clutch torque change to the second clutch torque used in the previous control operation in the step S40.

When the shift phase is the inertia phase, the weight matrix for control reference following errors is:

$$Q = \begin{bmatrix} q_1 & 0 & 0 & 0 \\ 0 & q_2 & 0 & 0 \\ 0 & 0 & q_3 & 0 \\ 0 & 0 & 0 & q_4 \end{bmatrix},$$

where $q_1$ indicates a weight for the vehicle jerk,
$q_2$ indicates a weight for a slip of the second clutch,
$q_3$ indicates a weight for the input torque, and
$q_4$ indicates a weight for the second clutch torque.
The weight matrix for control input change is:

$$R = \begin{bmatrix} r_1 & 0 \\ 0 & r_2 \end{bmatrix},$$

where $r_1$ indicates a weight for the input torque change, and
$r_2$ indicates a weight for the second clutch torque change.

When the shift phase is the inertia phase, in the step S30 of calculating the control input change for minimizing the cost functions by an optimization method, the control variable matrix meets control variable constraints expressed as:

$$\begin{bmatrix} \alpha_{min} \\ x_{2,min} \\ x_{5,min} \\ x_{6,min} \end{bmatrix} \leq z = \begin{bmatrix} \alpha \\ x_2 \\ x_5 \\ x_6 \end{bmatrix} \leq \begin{bmatrix} \alpha_{max} \\ x_{2,max} \\ x_{5,max} \\ x_{6,max} \end{bmatrix}$$

The control input matrix is configured to meet control input constraints expressed as:

$$\begin{bmatrix} \Delta T_{in,min} \\ \Delta T_{c2,min} \end{bmatrix} \leq u = \begin{bmatrix} u_1 \\ u_2 \end{bmatrix} \leq \begin{bmatrix} \Delta T_{in,max} \\ \Delta T_{c2,max} \end{bmatrix}$$

Although the specific embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A method of controlling a powertrain of a vehicle, the method comprising:
during shifting in which a first clutch is released and a second clutch is engaged,
determining whether a current shift phase is a torque phase or an inertia phase;
configuring different cost functions for the torque phase and the inertia phase;
calculating a control input change for minimizing the cost functions in the torque phase and the inertia phase; and
controlling at least two among input torque, first clutch torque, or second clutch torque input to a transmission by applying the control input change calculated for the torque phase and the inertia phase;
wherein each of the cost functions is:

$$\min_{\Delta u} \sum_{j=0}^{N_x-1} \|z^i(k+j|k) - r^i(k)\|_Q^2 + \sum_{j=0}^{N_u-1} \|\Delta u^i(k+j|k)\|_R^2, \text{ and}$$

$i \in \{tp, ip\}$, where tp indicates a torque phase, ip indicates an inertia phase,
$N_x$ indicates a prediction horizon,
$N_u$ indicates a control horizon,
k indicates a sampling time,
$z^i$ indicates a control variable matrix,
$r^i$ indicates a control reference matrix,
$u^i$ indicates a control input matrix,
Q indicates a wweight matrix for control reference following errors, and
R indicates a weight matrix for a control input change.

2. The method of claim wherein when the shift phase is the torque phase,
the control variable matrix is:

$$z^{tp}=[\alpha x_4 x_5 x_6]^T,$$

where $\alpha$ indicates a vehicle jerk,
$x_4$ indicates torsion between the first clutch and a drive wheel,
$x_5$ indicates the first clutch torque, and
$x_6$ indicates the second clutch torque, and
the control reference matrix may be:

$$r^{tp}=[0 r_4 r_5 r_6]^T,$$

where $r_4$ indicates reference torsion between the first clutch and the drive wheel,
$r_5$ indicates first reference clutch torque, and
$r_6$ indicates second reference clutch torque.

3. The method of claim 2, wherein when the shift phase is the torque phase, the control input matrix is:

$$u^{tp}=[u_1, u_2]^T = \left[\frac{dT_{c1}}{dt}, \frac{dT_{c2}}{dt}\right]^T,$$

where $T_{c1}$ indicates the first clutch torque, and
$T_{c2}$ indicates the second clutch torque.

4. The method of claim 3, wherein when the shift phase is the torque phase, the weight matrix for the control reference following errors is:

$$Q = \begin{bmatrix} q_1 & 0 & 0 & 0 \\ 0 & q_2 & 0 & 0 \\ 0 & 0 & q_3 & 0 \\ 0 & 0 & 0 & q_4 \end{bmatrix},$$

where $q_1$ indicates a weight for the vehicle jerk,
$q_2$ indicates a weight for the torsion between the first clutch and the drive wheel,
$q_3$ indicates a weight for the first clutch torque, and
$q_4$ indicates a weight for the second clutch torque, and
the weight matrix for the control input change is:

$$R = \begin{bmatrix} r_1 & 0 \\ 0 & r_2 \end{bmatrix},$$

where $r_1$ indicates a weight for a first clutch torque change, and
$r_2$ indicates a weight for a second clutch torque change.

5. The method of claim 4, wherein when the shift phase is the torque phase, in the calculation of the control input change for minimizing the cost functions by the optimization,
the control variable matrix meets control variable constraints:

$$\begin{bmatrix} \alpha_{min} \\ x_{4,min} \\ x_{5,min} \\ x_{6,min} \end{bmatrix} \leq z = \begin{bmatrix} \alpha \\ x_4 \\ x_5 \\ x_6 \end{bmatrix} \leq \begin{bmatrix} \alpha_{max} \\ x_{4,max} \\ x_{5,max} \\ x_{6,max} \end{bmatrix},$$

and
the control input matrix is configured to meet control input constraints:

$$\begin{bmatrix} \Delta T_{c1,min} \\ \Delta T_{c2,min} \end{bmatrix} \leq u = \begin{bmatrix} u_1 \\ u_2 \end{bmatrix} \leq \begin{bmatrix} \Delta T_{c1,max} \\ \Delta T_{c2,max} \end{bmatrix}$$

6. The method of claim 5, wherein when the shift phase is the torque phase,
the control input change calculated by the optimization comprises the first clutch torque change and the second clutch torque change, and
the first clutch torque and the second clutch torque are controlled by applying the first clutch torque change and the second clutch torque change.

7. The method of claim 1, wherein when the shift phase is the inertia phase, the control variable matrix is:

$$z^{ip}=[\alpha x_2 x_5 x_6]^T,$$

where $\alpha$ indicates a vehicle jerk,
$x_2$ indicates a slip of the second clutch,
$x_5$ indicates the input torque, and
$x_6$ indicates the second clutch torque, and
the control reference matrix may be:

$$r^{ip}=[0 r_2 r_5 r_6]^T,$$

where $r_2$ indicates a reference slip of the second clutch,
$r_5$ indicates a reference input torque, and
$r_6$ indicates a reference second clutch torque.

8. The method of claim 7, wherein when the shift phase is the inertia phase, the control input matrix is:

$$u^{ip}=[u_1, u_2]^T = \left[\frac{dT_{in}}{dt}, \frac{dT_{c2}}{dt}\right]^T,$$

where $T_{in}$ indicates the input torque, and
$T_{c2}$ indicates the second clutch torque.

9. The method of claim 8, wherein when the shift phase is the inertia phase, the weight matrix for the control reference following errors is:

$$Q = \begin{bmatrix} q_1 & 0 & 0 & 0 \\ 0 & q_2 & 0 & 0 \\ 0 & 0 & q_3 & 0 \\ 0 & 0 & 0 & q_4 \end{bmatrix},$$

where $q_1$ indicates a weight for the vehicle jerk,
$q_2$ indicates a weight for a slip of the second clutch,
$q_3$ indicates a weight for the input torque, and
$q_4$ indicates a weight for the second clutch torque, and
the weight matrix for the control input change is:

$$R = \begin{bmatrix} r_1 & 0 \\ 0 & r_2 \end{bmatrix},$$

where $r_1$ indicates a weight for an input torque change, and
$r_2$ indicates a weight for a second clutch torque change.

10. The method of claim 9, wherein when the shift phase is the inertia phase, in the calculation of the control input change for minimizing the cost functions,
the control variable matrix meets control variable constraints:

$$\begin{bmatrix} \alpha_{min} \\ x_{2,min} \\ x_{5,min} \\ x_{6,min} \end{bmatrix} \leq z = \begin{bmatrix} \alpha \\ x_2 \\ x_5 \\ x_6 \end{bmatrix} \leq \begin{bmatrix} \alpha_{max} \\ x_{2,max} \\ x_{5,max} \\ x_{6,max} \end{bmatrix},$$

and
the control input matrix is configured to meet control input constraints:

$$\begin{bmatrix} \Delta T_{in,min} \\ \Delta T_{c2,min} \end{bmatrix} \leq u = \begin{bmatrix} u_1 \\ u_2 \end{bmatrix} \leq \begin{bmatrix} \Delta T_{in,max} \\ \Delta T_{c2,max} \end{bmatrix}$$

11. The method of claim 10, wherein when the shift phase is the inertia phase,
the control input change calculated by the optimization comprises the input torque change and the second clutch torque change, and
the input torque and the second clutch torque input to the transmission are controlled by applying the input torque change and the second clutch torque change.

\* \* \* \* \*